United States Patent [19]

Nares

[11] Patent Number: 5,706,850

[45] Date of Patent: Jan. 13, 1998

[54] OIL DIFFUSER

[75] Inventor: Terry Nares, Syracuse, N.Y.

[73] Assignee: Carrier Corporation, Syracuse, N.Y.

[21] Appl. No.: 752,240

[22] Filed: Nov. 19, 1996

[51] Int. Cl.[6] ................................ B01D 17/00

[52] U.S. Cl. ................ 137/171; 55/462; 62/470; 62/503

[58] Field of Search .............. 137/171; 55/431, 55/439, 462; 62/470, 471, 503

[56] References Cited

U.S. PATENT DOCUMENTS 3,283,524  11/1966  Byron ........................ 62/503 X

FOREIGN PATENT DOCUMENTS 3545013  12/1986  Germany ...................... 62/503

*Primary Examiner*—Gerald A. Michalsky

[57] ABSTRACT

The present invention provides an oil diffuser in the suction line of a compressor. The oil diffuser provides an increased cross sectional area whereby the flow velocity is decreased and further provides non-aligned entering and discharge lines whereby inertial forces and gravitational forces acting on oil flowing into the diffuser tends to move the oil away from the circuitous path necessary for entering into the discharge line. The resulting separated oil can enter the discharge line via a small hole in the tube which only permits metered mounts of oil to be supplied to the suction of the compressor.

4 Claims, 1 Drawing Sheet

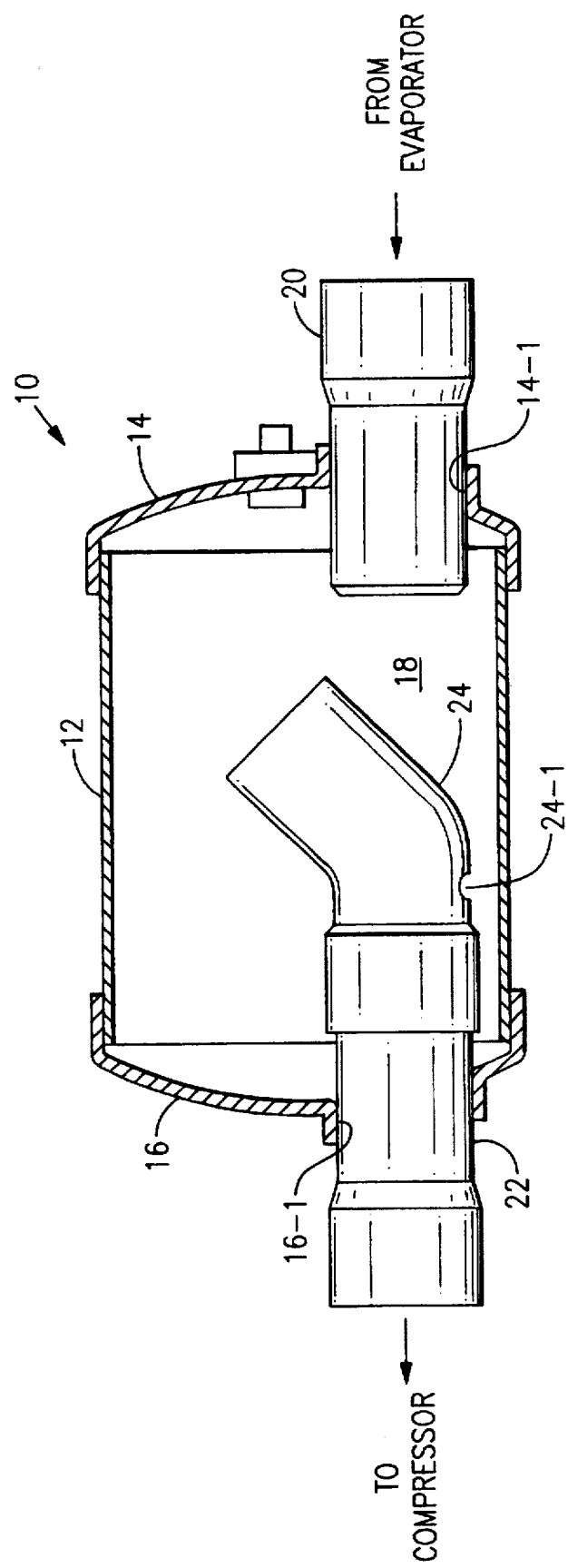

1

OIL DIFFUSER

BACKGROUND OF THE INVENTION

In positive displacement compressors such as reciprocating refrigerant compressors, gaseous refrigerant is drawn into a cylinder and is then compressed due to the movement of the piston in the bore. The piston acts against the trapped volume causing it to decrease in volume and increase in pressure. When the pressure increases to a point sufficient to overcome the bias of the discharge valve together with the discharge pressure acting on the discharge side of the valve, the valve is opened and the compressed gas is discharged from the cylinder. This process can be repeated hundreds of times each minute of operation. Problems arise, particularly at start up when more than the normal nominal amounts of oil, an incompressible material, are fed to the cylinder. The problems result from the dense oil impinging upon the reed(s) of the suction valve(s) due to inertial forces and from the volume that has to be discharged in the small time available. The oil flowing into the cylinder with the rapidly flowing gas does not flow around the reed because of inertial forces and, in impinging upon the reed, tends to cause it to be driven against its valve stop which can damage the reed. The damage usually takes a number of cycles but a small fraction of the design life. Since it is incompressible, the oil volume that must be discharged does not get reduced and the pressure builds up after discharge starts to the extent that the rate of discharge is less than the reduction in volume due to movement of the piston. Another consequence is that the discharge valve reed may be broken due to the flexure of the discharge valve to the limits permitted by the valve stop due to impingement by the oil. This normally takes a number of cycles before there is failure. A situation that may cause an immediate failure is where the pressure builds up sufficiently due to the inability of the structure to accommodate the necessary volumetric flow. This pressure can be sufficient to create damage to the connecting rod and related structure. The problems related to oil slugs are typically addressed by the use of a suction line accumulator.

SUMMARY OF THE INVENTION

The present invention places an oil diffuser in the suction line of a positive displacement compressor. The oil diffuser provides an enlarged cross section which results in the temporary slowing of the flow. The entering and discharge lines of the diffuser are not aligned and in combination with the slowed flow tends to separate the gaseous refrigerant from the oil which collects at the bottom of the diffuser. A small hole in the discharge line permits the flowing gaseous refrigerant to aspirate only metered amounts of oil into the suction gas being supplied to the compressor. Oil in the metered amounts permitted by the diffuser can be fed to the compressor without causing damage to the compressor.

It is an object of this invention to prevent compressor failure.

It is another object of this invention to break up oil slugs. These objects, and others as will become apparent hereinafter, are accomplished by the present invention.

Basically, the present invention provides an oil diffuser in the suction line of a compressor. The oil diffuser provides an increased cross sectional area whereby the flow velocity is decreased and further provides non-aligned entering and discharge lines whereby inertial forces and gravitational forces acting on oil flowing into the diffuser tends to move the oil away from the circuitous path necessary for entering into the discharge line. The resulting separated oil can enter the discharge line via a small hole in the tube which only permits metered amounts of oil to be supplied to the suction of the compressor.

BRIEF DESCRIPTION OF THE DRAWING

For a fuller understanding of the present invention, reference should now be made to the following detailed description thereof taken in conjunction with the accompanying drawings wherein:

The FIGURE is a partially sectioned, vertical view of the oil diffuser of the present invention.

DESCRIPTION OF THE PREFERRED EMBODIMENT

In the FIGURE, the numeral 10 generally designates the oil diffuser of the present invention. Oil diffuser 10 has a casing made of cylindrical body portion 12 and end caps 14 and 16 which are brazed or otherwise suitably secured together to form chamber 18. Inlet line 20 extends through opening 14-1 in the lower half of end cap 14 and is secured therein by brazing or some other suitable method. The outlet line is made up of two members, tube 22 which corresponds to inlet line 20 and elbow 24. Tube 22 extends through an opening 16-1 in the lower half of end cap 16 and is generally axially aligned with inlet line 20. Tube 22 is secured in place in opening 16-1 of cap 16 by brazing or some other suitable method. Elbow 24 which is illustrated as being at 45° is located in chamber 18 and is suitably secured at one end to tube 22 with the other end extending upwardly and having its open end located above inlet line 20. A metering hole 24-1 is located in the bottom part of elbow 24, preferably in the portion of elbow 24 which is coaxial with tube 22. The only location requirement for hole 24-1 is that it be located in chamber 18 and at a low level so that, if necessary or desired, it could be located in tube 22, or in the bend of elbow 24.

In a preferred suitable configuration, cylindrical portion 12 would have an outside diameter of about 4, inches. Members 20, 22 and 24 would be on the order of 1.375 inches in diameter. The diameter of hole 24-1 is on the order of 0.1875 inches. With these dimensions, the cross sectional area of the flow path will increase on the order of fifteen fold in passing from line 20 into chamber 18.

In operation, the compressor (not illustrated) will be drawing gaseous refrigerant into the suction chamber(s) of the compressor via oil diffuser 10. Since there is an affinity between lubricants and refrigerants used in refrigeration compressors, some oil will normally be present in the suction gas. Under some conditions, particularly at start up major amounts of oil may be present in the suction gas. Suction gas being drawn into chamber 18 via inlet line 20 will slow due to the larger cross sectional area of the flow path in chamber 18. The suction gas and entrained oil will tend to impinge upon the portion of elbow 24 facing inlet line 20 due to inertia although the entrained oil will tend to move in a trajectory due to gravity. Impingement will tend to separate the oil from the gaseous refrigerant. However, separation due to impingement, the reduced flow velocity, inertia and gravity combine to essentially eliminate the possibility of any significant amount of oil being carried into elbow 24 with the refrigerant gas which flows from chamber 18 into elbow 18, thence into tube 22 and into the compressor. The oil tends to collect in the bottom of chamber 18. When the oil level comes up to the level of metering hole 24-1, the gaseous refrigerant, which again picks up speed is passing through elbow 24 and tube 24-1 aspirates or entrains the oil from chamber 18 via metering hole 24-1 in acceptable amounts so as to not damage the compressor.

Although a preferred embodiment of the present invention has been illustrated and described, other changes will occur to those skilled in the art. It is therefore intended that the scope of the present invention is to be limited only by the scope of the appended claims.

What is claimed is:

1. An oil diffuser comprising:
   a horizontally extending casing including a body portion and first and second end portions which coact to define a chamber;
   said first and second end portions each having an opening in its lower portion;
   an inlet line sealingly secured in said opening in said first end portion and extending into said chamber essentially in alignment with said opening in said second end portion;
   an outlet line having a first portion sealingly secured in said opening of said second end portion and extending into said chamber essentially in alignment with said inlet line;
   said outlet line having a second portion facing said inlet line and extending upwardly above said inlet line and including an inlet in said second portion at a location above said inlet line;
   a metering opening formed in the bottom of said first portion of said outlet line at a point within said chamber whereby flow entering said chamber via said inlet line tends to impinge upon said second portion of said outlet line causing separation of oil contained in said flow entering said chamber with said separated oil collecting in said chamber and exiting said chamber in a metered fashion via said metering opening due to aspirating into flow passing through said outlet line.

2. The diffuser of claim 1 wherein said chamber is essentially cylindrical.

3. The diffuser of claim 1 wherein said second portion is an elbow.

4. The diffuser of claim 3 wherein said elbow makes an angle of 45°.

* * * * *